United States Patent [19]
Duran

[11] 3,917,331
[45] Nov. 4, 1975

[54] ROTATABLE LOCKING MECHANISM HAVING MOVABLE DETENTS

[75] Inventor: John A. Duran, Glendora, Calif.

[73] Assignee: Avibank Mfg. Inc., Burbank, Calif.

[22] Filed: Jan. 4, 1974

[21] Appl. No.: 430,725

[52] U.S. Cl. ................................ 292/338; 292/196
[51] Int. Cl.$^2$ .......................................... E05C 17/04
[58] Field of Search ........... 292/252, 338, 262, 196, 292/277; 339/91 B

[56] References Cited
UNITED STATES PATENTS

| | | | |
|---|---|---|---|
| 1,274,181 | 7/1918 | Meyers | 292/338 X |
| 1,851,612 | 3/1932 | Werth | 292/338 |
| 2,983,978 | 5/1961 | Wilgus | 339/91 B |

*Primary Examiner*—Richard E. Moore
*Attorney, Agent, or Firm*—Poms, Smith, Lande & Glenny

[57] ABSTRACT

A rotatable locking mechanism is provided for releasably securing relatively rotatable members, such as a member which is rotatably positionable with respect to a support member. A releasable ball detent locking assembly is mounted in one of the members for cooperating with selectively disposed indentations in the other member. In one of the embodiments, the detent assembly is mounted within the rotatable member and is provided with a manually actuated release mechanism for selectively positioning such member at one or more predetermined angular relationships with respect to the support member. In the locked condition, the ball detents are caused to protrude from the rotatable member and seat within the indentations formed on the support member. To free the rotatable member, the release mechanism is manually operated to retract the ball detents to a generally recessed or flush relationship with respect to a surrounding wall portion of the rotatable member. During rotation, the ball detents are captivated in their retracted position by a closely confronting wall portion of the support member, against which the bass detents are continuously urged by a spring bias associated with the release mechanism. The members are free to rotate in this condition until the ball detents encounter an indentation in the support member whereupon the detents snap outwardly into their locked, protruding condition. This locking mechanism is embodied in structures which are useful in a variety of applications including rotatable lockable struts, collapsible lockable handles, and lockable latches.

15 Claims, 23 Drawing Figures

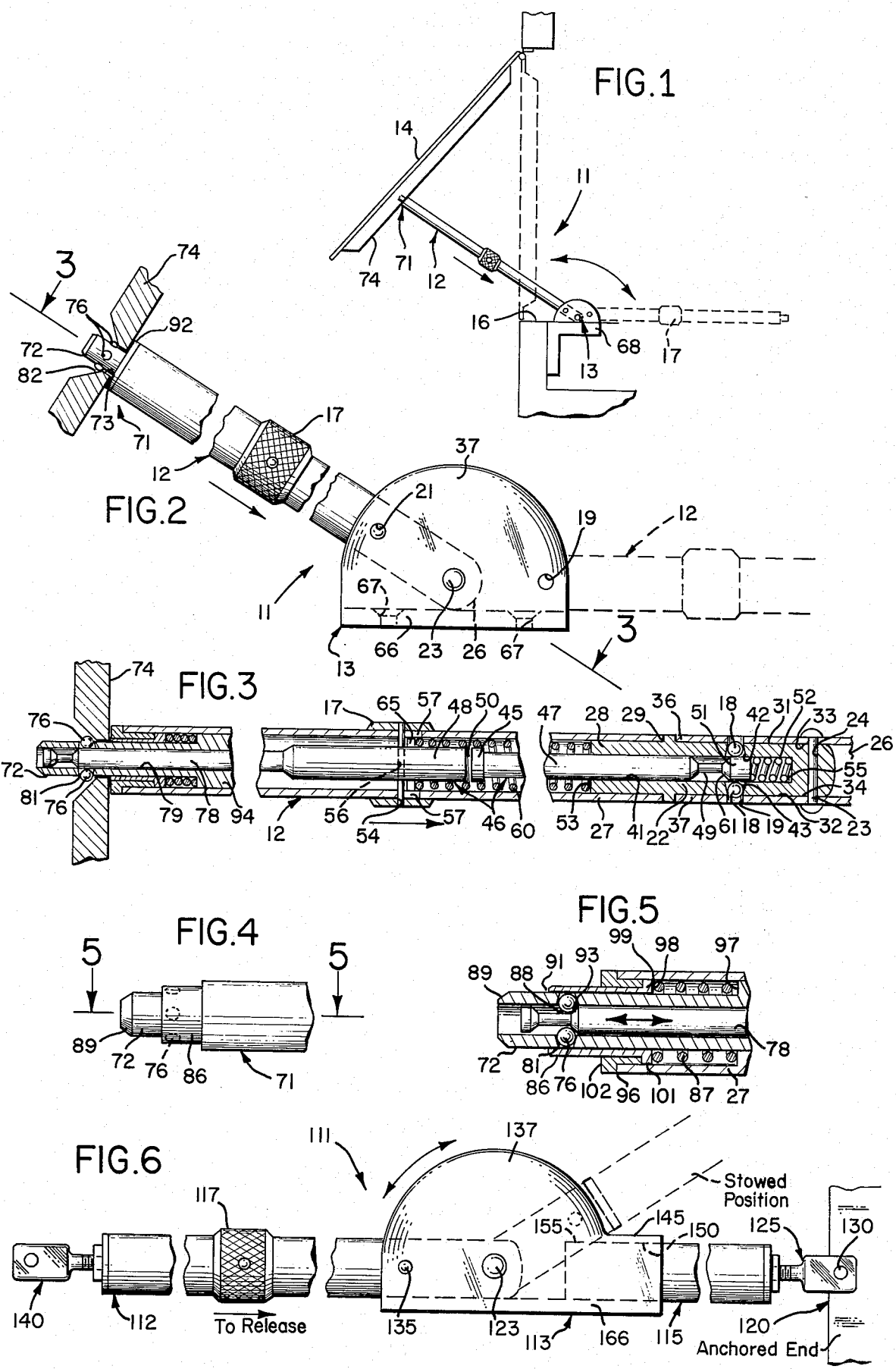

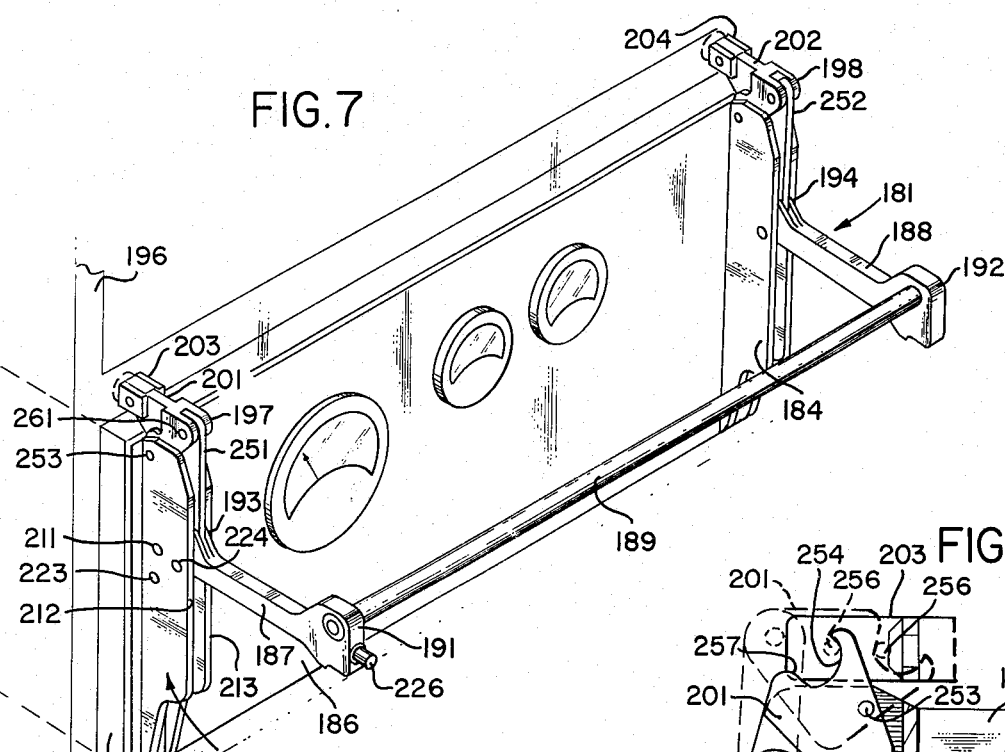
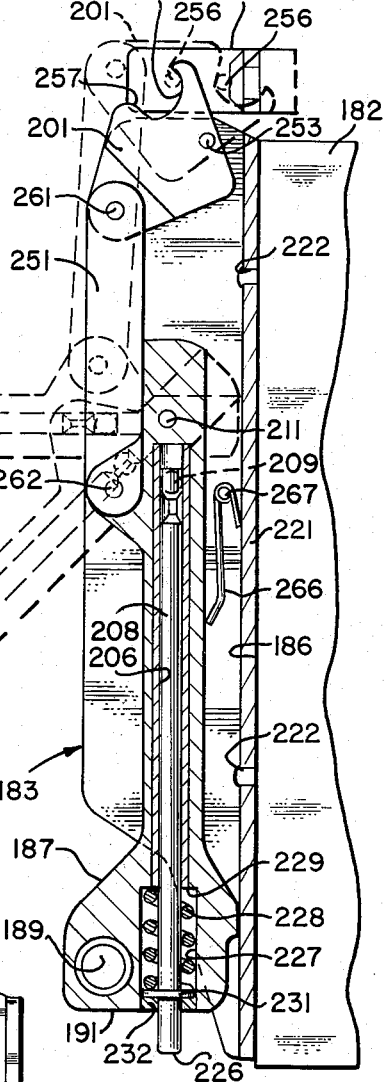
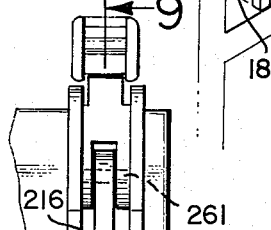
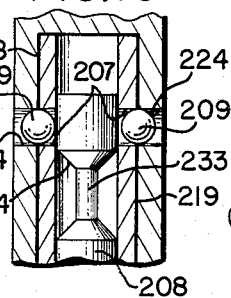
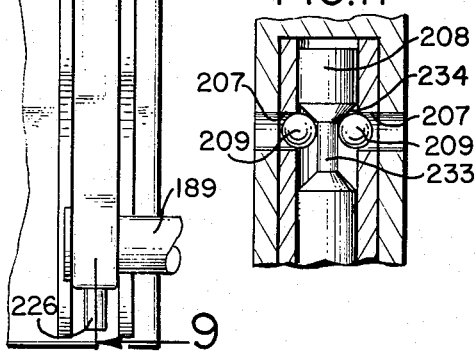
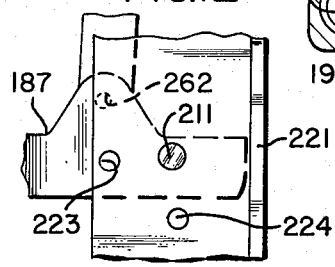

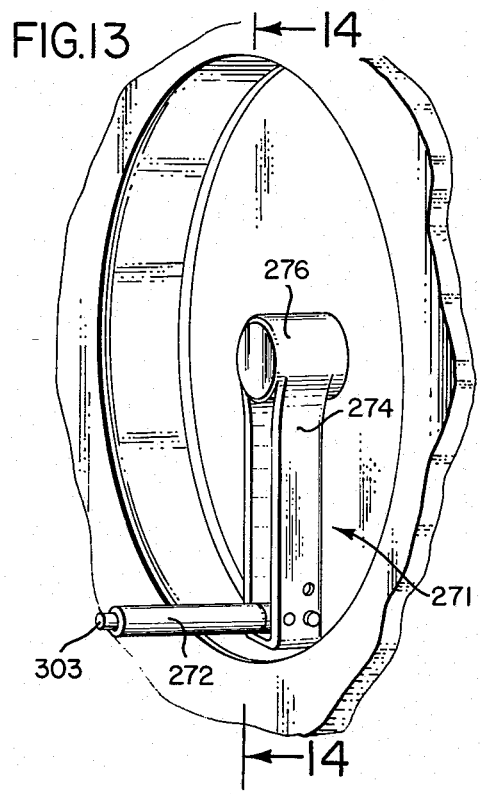
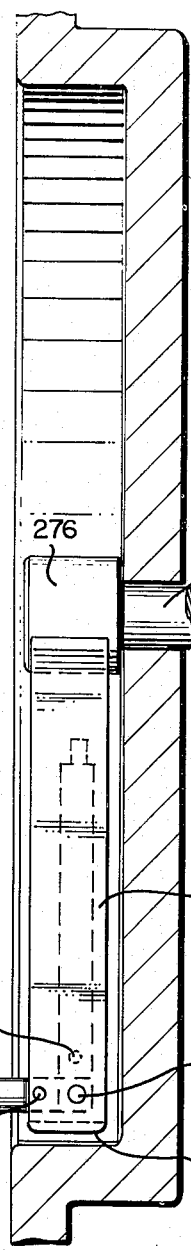
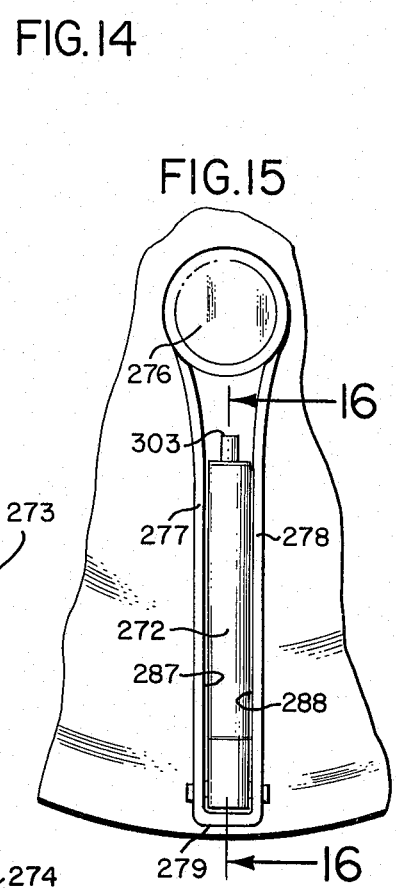
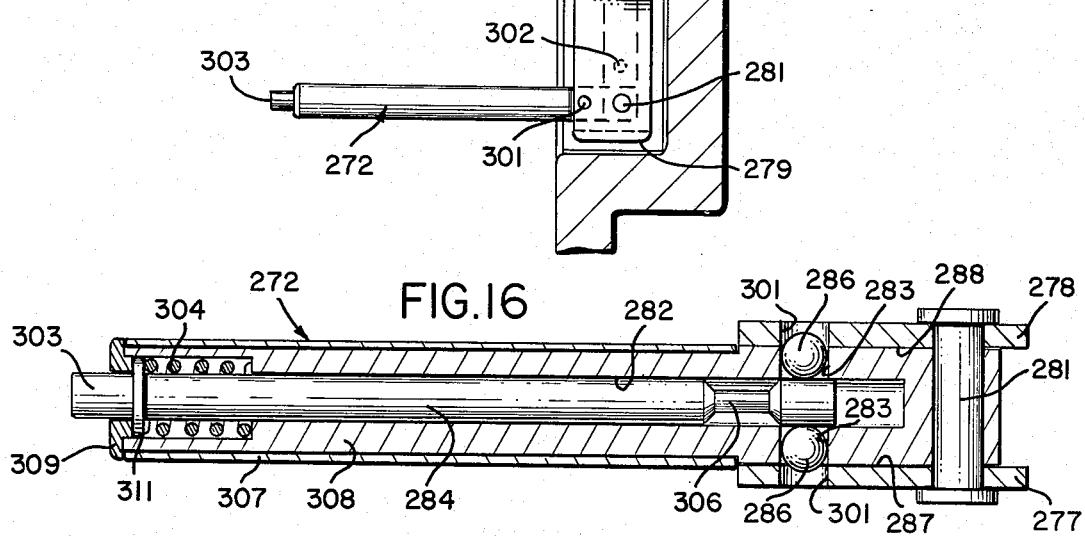
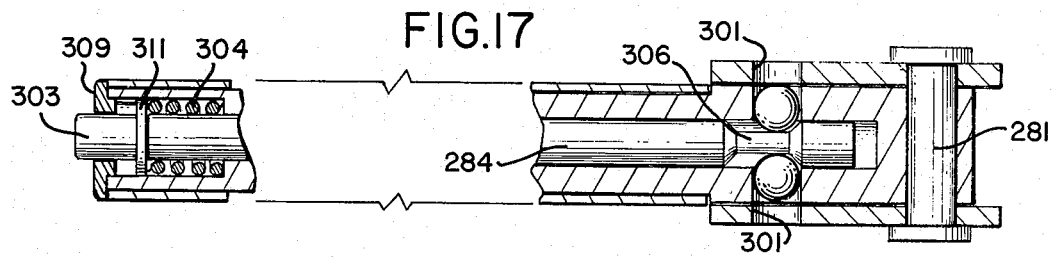

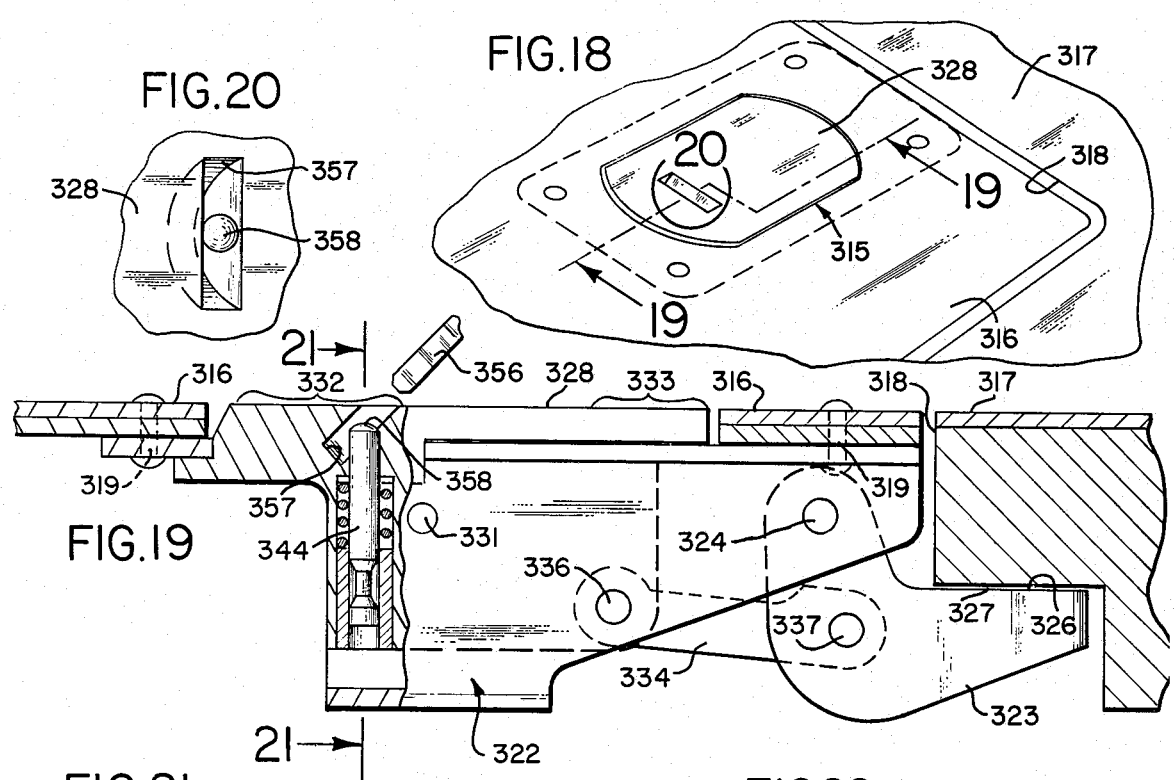
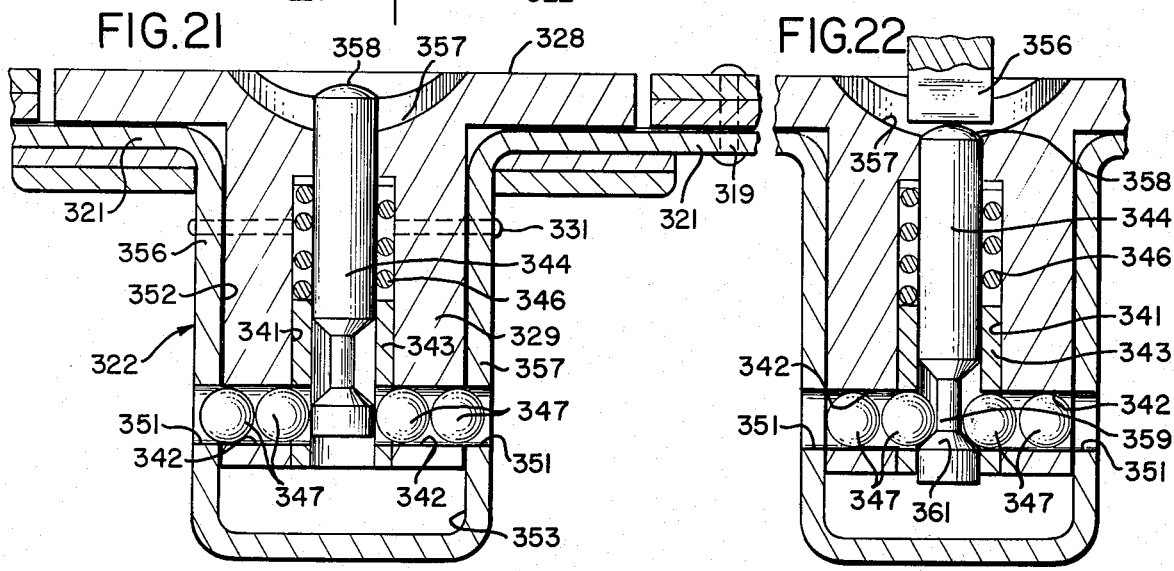
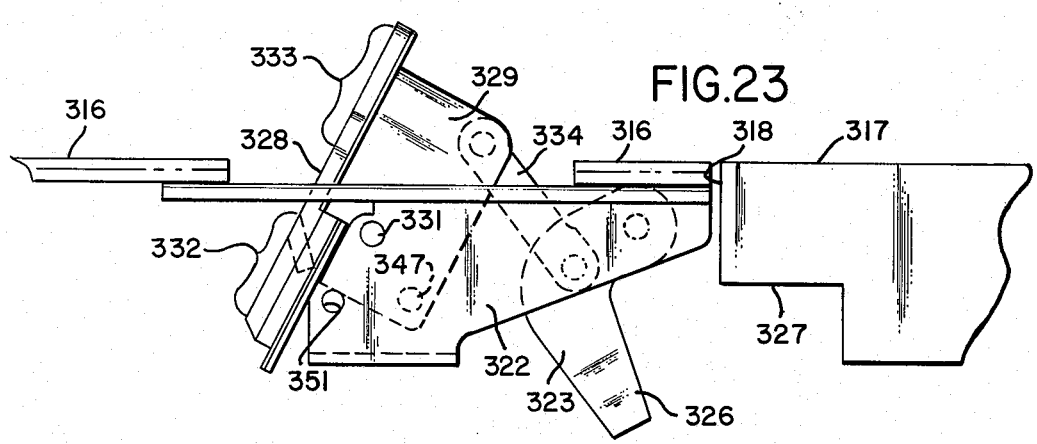

ROTATABLE LOCKING MECHANISM HAVING MOVABLE DETENTS

BACKGROUND OF THE INVENTION

The present invention in general relates to a locking mechanism for rotatably mounted members. The mechanism may be disposed in a locked condition for securing the members at one or more preselected angular relationships, or actuated to a release condition in which the members are free to rotate.

A locking mechanism capable of the above-mentioned operation is useful in a variety of applications. For successful employment, the locking mechanism should be of a relatively compact structure, providing a positive locking action together with quick releasability, and should provide long, reliable and trouble-free operation.

In general, these objectives are provided in accordance with the present invention by mounting a movable detent locking assembly including movable detents such as ball detents within a rotatably positionable member. Such member is in turn pivotally secured to a support member having cooperating indentations. The support member is formed with a wall portion or portions coextensive and in close proximity with the rotational path of the ball detents carried by the positionable member so as to captivate and maintain the ball detents in their retracted condition during the unlocked, rotational movement of the members.

As the positionable member is rotated to approach the locked angular orientation, the ball detents are automatically forced outwardly by a spring bias to their protruding, locked condition seated within the indentations of the support member. A release mechanism is provided for overcoming the spring bias of the ball detent assembly and allowing the ball detents to be released to their retracted condition to unlock the positionable member and permit rotation thereof.

In one embodiment of the present invention as disclosed herein, the positionable member is provided in the form of an elongated, load bearing strut member having one of its ends rotatably or pivotally mounted to a support member. The ball detent locking assembly is advantageously carried within a hollow interior portion of the elongated strut with the ball detents being disposed for cooperating with indentations formed in the support. The indentations are disposed so as to afford different locked angular relationships between the strut and the support. In one example, the strut member is advantageously employed to hold open an aircraft hatch. For this purpose, the strut is rotatable between a locked, out-of-the-way stowed angular position and an angular position in which the strut serves as a load bearing member for supporting the open hatch.

In still another embodiment of the invention, the relatively rotatable members and ball detent locking mechanism provide a lockable, collapsible handle for a rack mounted, semi-portable instrumentation chassis or the like. In this case, the handle is rotatable between a collapsed, locked condition in which the chassis is simultaneously latched or locked to the supporting rack, and an extended, locked condition in which the handle is displaced outwardly for convenient manual grasping and transporting of the chassis. A push-button manual release actuator is provided therewith for releasing the handle from either of its locked, angular positions to afford rotation to the other position.

Still another embodiment of the present invention utilizes the relatively rotatable, lockable members to form a collapsible, manually engageable crank handle. A portion of the crank serves as the support member to which a manually engageable crank handle is pivotally mounted for rotation between a locked, recessed position and a locked, extended position for manual grasping and crank operation. Again, a push-button finger release actuator may be provided as disclosed herein for releasing the handle from the locked, angular orientations.

Another embodiment of the present invention takes the form of a manually operated latch mechanism in which a manually engageable portion of the latch is pivotally mounted to a support member for rotation between latched and unlatched angular positions. The manually engageable and rotatable component of the latch carries the ball detent locking assembly for rotation of the ball detents to and from a locked, angular relationship with indentations formed in the latch support member. As disclosed herein, the indentations formed on the support member may be positioned so as to lock the manually rotatable member in the same angular condition in which the latch itself is closed. As a safety feature, the release mechanism may be constructed so as to be actuated only by a suitable shaped release tool.

These and further embodiments of the present invention and further advantages and features thereof are described more fully herein. The following description is to be read in conjunction with the appended drawings of the exemplary embodiments.

BRIEF DESCRIPTION OF THE DRAWINGS

FIG. 1 is an elevational view, partly in section, illustrating one of the embodiments of the present invention in which the releasable ball detent locking mechanism is provided in the form of a positionable, lockable strut member.

FIG. 2 is an enlarged, detailed view of the strut assembly shown in FIG. 1.

FIG. 3 is an enlarged cross sectional view of the strut member shown in FIGS. 1 and 2 taken generally along the section lines 3—3 of FIG. 2.

FIG. 4 is a further detailed view of a pin ball detent locking mechanism provided on a remote axial end of the strut member of FIGS. 1 through 3, here showing the pin locking mechanism in its unlocked, released condition.

FIG. 5 is a cross sectional view of the pin locking mechanism of FIG. 4 taken generally along the section lines 5—5 therein.

FIG. 6 is an elevational view of an alternative strut embodiment of the present invention in which a pair of elongated strut members are pivotally connected at one of the ends thereof and provided with the ball detent locking mechanism to selectively set the angular orientation therebetween.

FIG. 7 is still a further alternative embodiment of the present invention in which the relatively rotatable members are mounted to form a collapsible, lockable handle assembly for a rack mounted instrumentation chassis or the like.

FIG. 8 is a front elevation view of the one side of the mechanism of FIG. 7 with the handle structure shown in the collapsed condition.

FIG. 9 is a sectional view taken generally along the section lines 9—9 of FIG. 8, with the solid lines showing the handle portion of the assembly in the collapsed condition and the phantom lines showing both an intermediate and the fully outwardly extended positions of the handle assembly.

FIGS. 10 and 11 are enlarged, detailed views of a portion of the ball detent locking assembly carried by the mechanism of FIGS. 7 through 9, in which FIG. 10 illustrates a locked position for the ball detents while FIG. 11 shows the ball detents in their unlocked, inwardly retracted position.

FIG. 12 is a further detailed, elevational view showing a portion of the structure of FIGS. 7 through 9.

FIG. 13 is a still further embodiment of the present invention in which the ball detent locking mechanism is provided in combination with a rotatable and collapsible manual crank handle.

FIG. 14 is an enlarged sectional view taken generally along the section lines 14—14 of FIG. 13.

FIG. 15 is a front elevational view of the collapsible crank handle assembly of FIG. 13, however here showing the manually engageable handle in its collapsed, locked condition.

FIG. 16 is an enlarged cross sectional view of the assembly taken generally along the section lines 16—16 of FIG. 15.

FIG. 17 is a sectional view similar to FIG. 16, although here showing the ball detent locking assembly in its unlocked condition with the ball detents released to their retracted condition.

FIG. 18 is a perspective view of a manually operated latch apparatus utilizing the ball detent locking mechanism in accordance with the present invention.

FIG. 19 is a cross sectional view taken generally along the broken section lines 19—19 of FIG. 18.

FIG. 20 is a detailed view of a portion of the latch shown in FIG. 18 as indicated by the circle at 20.

FIG. 21 is a cross sectional view taken generally along the section lines 21—21 of FIG. 19.

FIG. 22 is a sectional view similar to FIG. 21, however here illustrating the ball detent locking assembly in its released, unlocked condition with the ball detents retracted.

FIG. 23 is a view similar to FIG. 19, however here illustrating the latch in its open, unlatched condition.

DESCRIPTION OF THE PREFERRED EMBODIMENT

As indicated above the rotatable releasable ball detent locking mechanism may be embodied in a variety of structures and devices. One particularly advantageous device is illustrated in FIGS. 1 through 5. Therein a positionable strut assembly 11 includes an elongate strut member 12 which is pivotally mounted to a support member 13 to allow the strut to be rotated between two or more selected angular orientations. Moreover, the strut and support members 12 and 13 are provided with a releasable ball detent locking mechanism which is operative to lock and secure the strut member in one or more of the selected angular positions.

In the presently illustrated embodiment, the strut assembly 11 is arranged to provide a stowable strut to support a door or hatch 14 in an open position to afford access through a hatch opening 16. As one example, hatch 14 and opening 16 may form a part of an aircraft body in which hatch 14 provides the access door for servicing equipment, fuel inlets, etc. within the body of the plane.

For efficient and safe servicing of the aircraft, it is desirable to provide the strut assembly 11 with a stowed out-of-the-way position as indicated by the dotted line position of strut member 12 in FIGS. 1 and 2, from which position the strut may be quickly rotated to an operative, load bearing position supporting hatch 14 in the open position as shown by the solid line position of member 12 in FIG. 1. These objectives are advantageously achieved in accordance with the present invention by a movable detent locking mechanism cooperating with strut member 12 and support 13 so that the strut may be locked in the stowed position by merely rotating member 12 to the dotted line position as shown in FIG. 1 whereupon the detent mechanism automatically locks the strut in the illustrated position. To release the strut member from its locked position, a manually engageable release collar 17 provides an actuator means for releasing the movable detents and allowing member 12 to be rotated to the forward load bearing position.

More particularly, the movable detent locking mechanism is provided in combination with members 12 and 13 by mounting a detent operating assembly including movable detent members such as ball detents 18 within elongate strut member 12 and by providing support member 13 with selectively disposed indentations, such as indentation 19 for cooperating with the detents 18 to define a locking position or positions for the strut. In general, ball detents 18 are displaced between a laterally inward retracted disposition in which the strut member 12 is released relative to support 13 and a laterally outward protruding disposition in which detents 18 seat within indentations 19 to lock the members against relative rotation.

Although the disclosed embodiments utilize ball members for detents 18, it will be appreciated that other detent shapes and configurations may be employed depending on the application.

In the illustrated embodiment, indentations 19 of support member 13 serve as locking indentation or indent means defining one locked position for strut member 12 which here corresponds to its stowed, out-of-the-way orientation. If desired, additional indentation means may be provided on support member 13, such as the here illustrated indentations 21 which provide for locking strut member 12 in its operative, load bearing position. Alternatively, it has been found advantageous in many cases to omit indentations 21 and/or indentations 19 to allow strut member 12 to have a freedom of rotation in its load bearing position and/or stowed position to accommodate different angles of hatch opening, tolerance variations, etc. In the presently illustrated embodiment, indentations 21 may be deleted because the angular orientation of the strut is fixed in its load bearing position by a locking receptacle located on hatch 14 as desdribed more fully herein.

With further reference to the ball detent operating assembly carried by strut member 12, it will be observed in connection with FIG. 3 that strut member 12 is provided with an end extension part 22 which itself is pivotally mounted to support 13 by means of transverse pivot pin 23 passing through bore 24 provided in part 22 adjacent the free end 26 thereof. Part 22 is of a generally elongate construction with the end thereof remote from the pivoted end being connected to a hollow tubular part 27 of member 12 so as to be axially aligned therewith. In this instance, part 22 is formed with an annular end portion 28 having an exterior cylindrical surface matingly fitted and secured inside the interior cylindrical wall of part 27 with the axial end of part 27 abutting against an annular external shoulder 29 formed on part 22.

Part 22 is in this instance formed with a pair of parallel and laterally opposed exterior wall portions extending longitudinally therewith and being dimensioned so as to provide a clearance fit between the inside wall portions 32 and 33 of a pair of spaced parallel walls 36 and 37 of support 13.

This construction provides members 12 and 13 with closely confronting wall portions, namely wall portions 31 and 33 and 32 and 34, respectively, which undergo relative rotational movement while maintaining the substantially constant plane parallel clearance therebetween. The closely confronting wall portions serve as described more fully herein to dispose the ball detents 18 in a position for proper seating within the indentations of support member 13 when strut member 12 is moved to one of its locked orientations, and to captivate ball detents 18 in their retracted, nonprotruding position during rotational travel of strut member 12 and end extension part 22 to and from the locked positions.

The hollow interior of tubular part 27 and an axial bore 41 provided in part 22 serve as an elongate spindle receiving bore means for strut member 12. As illustrated, the axial bore 41 extends adjacent to and inwardly of the exterior wall portions 31 and 32 of part 22.

For receiving and holding ball detents 18, part 22 is further provided with transverse detent receiving openings 42 and 43 communicating between axial bore 41 and the exterior wall portions 31 and 32 of part 22. Openings 42 and 43 are dimensioned relative to ball detents 18 to permit displacement thereof to a position in which the ball detents protrude outwardly from wall portions 31 and 32 into seated, locked engagement with indentations 19.

To prevent escapement of the ball detents during the assembly of the mechanism, the outer circumference of openings 42 and 43 may be peened or staked after the ball detents have been inserted in place. The peening or staking of part 22 should not overly restrict the movability or displaceability of the ball detents to their protruding disposition. Furthermore, the transverse openings 42 and 43 in part 22 are disposed at the same radial distance from pivotal pin 23 as are indentations 19 and 21 so that rotation of strut member 12 will bring openings 42 and 43 into registration with the support member indentations.

To provide for operating or displacing ball detents 18 between their protruding and retracted positions, a spindle release means is mounted for axial movement within the bore means of the strut member. In this instance, the spindle release means is provided by an elongate cylindrical or rod-like spindle 46 having a portion 47 adjacent one end, axially slidably disposed within axial bore 41 of part 22 and a main body portion 48 extending coaxially within hollow tubular part 27 of strut member 12 and being axially slidably positioned adjacent the opposite strut end.

In this embodiment, spindle portion 47 is axially detached from the main body portion 48 with an enlarged end 45 of portion 47 positioned for axial abutment with an end 50 of spindle portion 48. Spindle portion 47 serves to operate the ball detents 18 and is provided for this purpose with a necked down or reduced diameter section 49 adjacent transverse openings 42 and 43.

In particular, as illustrated in FIG. 3 spindle 46 is disposed in an axial position in which the relative larger diameter section 51 of spindle portion 47 is in registration with transverse openings 42 and 43 to cause the ball detents to be forced laterally outwardly to their protruding positions. Spindle 46 may on the other hand be axially displaced in the direction of support 13 so as to move portion 47 and the reduced diameter section 49 thereof to a position in registration with openings 42 and 43. As will be observed, this allows ball detents 18 to retract inwardly to a relatively recessed relationship with wall portions 31 and 32 to unlock strut member 12 relative to the support member indentations 19.

After displacing spindle 46 to the release position, in which the ball detents are retracted, and after rotating strut member 12 and part 22 thereof to a position away from indentations 19 or 21, the ball detents 18 will be maintained in a captivated, retracted condition by virtue of the closely confronting interior wall portions 33 and 34 of support 13. This captivated condition of the ball detents is maintained even if there is an attempted urging of spindle portion 47 toward its position as illustrated in FIG. 3. In other words, any attempted urging of the ball detents 18 to their protracted position fails because of the abutment of the ball detents against the confronting wall portions 33 and 34 of support 13. Similarly, spindle portion 47 is held in a position displaced toward support 13 so long as detents 18 remain captivated. During rotation of strut member 12 and while the ball detents are captivated by their engagement with wall portions 33 and 34, the ball detents act as ball bearings rotating or slipping with the relative movement of the engaged wall portions 33 and 34.

Free relative rotation is thus provided between members 12 and 13 until one of the indentations of support member 13 is approached by the captivated ball detents whereupon the ball detents may be forced outwardly to lock in the indentations. It will thus be observed that detents 18 serve as detent means which may be displaced between their protruding and retracted positions by the spindle means. In particular, spindle 46 and portion 47 thereof serve to lock or release the relatively rotatable members 12 and 13 in cooperation with the locking indent means provided by one or more indentations such as indentations 19 and 21 in member 13.

To provide a positive locking action of the mechanism and yet permit a quick manual release of strut member 12 from a locked condition, spring means may be provided for continuously urging the spindle release means toward a position in which the ball detents 18 are protruding from part 22.

In this instance the spring means for spindle portion 47 is provided by a coiled compression spring 52 coaxially mounted within hollow cylindrical free space 55 formed as an axial extension of bore 41. One end of spring 52 is seated against the end wall of bore 41 while the opposite end of the spring abuts against the axial end of spindle portion 47.

Additionally, the spring means may include a spring for continuously urging spindle portion 48 toward support 13. For this purpose a coiled compression spring 60 may be provided. One end of spring 60 is seated against an annular shoulder 53 of a part 22, while the opposite spring end seats against a washer 65 lying against a transverse shear pin 54 securing release collar 17 to the spindle portion 48. Pin 54 passes through a transverse mounting hole 56 formed in the main body portion 48 of spindle 46 and is mounted in diammetrically opposed openings of collar 17 as illustrated.

The axial travel of spindle 46 is determined in this instance by longitudinally extending slots 57 provided within tubular part 27 and cooperating with pin 54 to define axial limits of the spindle release means at the opposed ends of the pair of slots 57. Springs 60 and 52 are under compression to continuously urge pin 54 to its axial limit in slots 57 away from support 13. This normally positions spindle 46 and portions 47 and 48 in the position shown in FIG. 3 with the ball detents 18 forced outwardly to their protruding orientation. This state will exist so long as the strut member 12 is in one of its locked angular positions and the ball detents are seated within the indentations of support 13.

On the other hand, collar 17 may be manually engaged as indicated above and forced toward support 13 to cause spindle 46 to be displaced axially toward support 13. This in turn repositions reduced diameter section 49 of spindle section 47 into lateral registration with openings 42 and 43 allowing the ball detents to be retracted and thus unlocking the mechanism.

Ensueing rotation of member 12 will cause the ball detents to assume their captivated condition as discussed above and thereby maintain spindle portion 47 in an unstable state displaced axially toward support member 13 and separated from portion 48 at abutting ends 45 and 50. That is, the portion 47 of the spindle release means assumes a condition in which it is attempting to force ball detents 18 outwardly to their protruding position but is unable to do so because of the captivating effect of closely confronting wall portions 33 and 34 of support 13. However, continued rotation of the strut to a lockable orientation allows the ball detents to be forced outwardly into the indentations of support 13 which in turn not only locks the strut in place but also allows spindle portion 47 to return to the condition shown in FIG. 3. In this manner it is observed that release collar 17 provides a manual actuator means for selective manual operation of the spindle release means provided by spindle 46.

To insure the automatic return of the spindle means to its condition shown in FIG. 3 in which the ball detents 18 are displaced to their protruding, locked condition, it is preferable to provide a tapered or camming section 61 connecting the reduced diameter section 49 and the relatively larger diameter section 51 of spindle portion 47. This camming section 61 serves to cam ball detents 18 outwardly under forced axial displacement of spindle 46 from its released position in which section 49 is in registration with openings 42 and 43 to its locked position in which section 51 registers with these openings. Thus when the ball detents encounter the indentations 19 or 21 of support 13, they may be cammed outwardly under the spring bias urging of spindle 46 to their protruding positions. Thus, it will be observed that this section 61 serves as a camming means in association with the spindle release means for moving or forcing said ball detents between their retracted and protruding positions in response to appropriate axial movement of spindle 46.

In this embodiment, spaced parallel walls 36 and 37 are of a semicircular configuration with the straight-edge portions thereof attached, or as in this case integral with a mountable base portion 66. Base portion 66 may be provided with mounting holes 67 for receiving screw or bolt fasteners for attachment to a supporting wall or bracket such as bracket 68 in FIG. 1. The mounting of base portion 66 thus disposes the spaced parallel walls 36 and 37 with their semicircular portions projecting away from the support 68.

The semicircular configuration of walls 36 and 37 is selected in this instance to provide wall portions 33 and 34 which are at least coextensive with the rotational path of ball detents 18 as strut member 12 is rotated. Thus regardless of the angular orientation to which strut member 12 is rotated, the interior wall portions 33 and 34 of walls 36 and 37 are always in closely confronting relationship with the exterior parallel walls 31 and 32 of part 22. Furthermore, by constructing walls 36 and 37 in this manner, the locking indentations, such as indentations 19 and 21, may be positioned at any desired angular location.

With further reference to the embodiment of the invention in FIGS. 1 through 5, strut member 12 is provided with an additional locking mechanism mounted at an end 71 remote from the pivotally mounted end 26. Although if desired, end 71 of strut member 12 may merely provide for engaging and supporting the downwardly directed gravitational force on hatch 14, it is preferable to lock end 71 in place. Also by providing the additional locking mechanism, the strut may be arranged to support a tension load.

For this purpose an automatic lockable and manually releasable ball detent pin locking means is disposed on end 71 of the strut to not only receive and support hatch 14 but also to lock the hatch in its open condition. Thus in situations where hatch 14 might be otherwise dislodged from end 71 of strut member 12, such as during windy conditions, the locking of the strut to the hatch avoids this risk.

In particular, the automatically lockable and manually releasable ball detent pin locking means is provided in this instance by a pin member 72 mounted as a fixed axial extension of strut member 12 for insertion into a round receptacle 73 carried by or formed in one of the walls 74 of hatch 14 as illustrated. Pin 72 carries a plurality of radially movable ball detents 76 for cooperation with a ball detent release spindle portion 78 mounted for axial reciprocation within an axial bore 79 formed within pin 72. Portion 78 of the spindle may be integral with portion 48 as shown here or a separate part axially joined to portion 48.

The construction and operation of pin 72 with ball detents 76 and release spindle portion 78 are known per se. Briefly however, ball detents 76 are moutned within staked radial openings 81 for movement between a radially inward retracted position and a radially outward protruding position. Ball detents 76 may be selectively disposed in their outward protruding position or inward retracted position by a reduced diameter section and camming section of spindle portion 78.

In the retracted condition of ball detents 76, pin 72 may be inserted into receptacle 37, and after such insertion the ball detents may be moved to their protruding condition so as to lock pin 72 from removal by the engagement of the protruding detents with a rear perimeter 82 of receptacle 73 as shown in FIGS. 2 and 3.

In accordance with the present invention, spindle portion 78 provides a spindle release means which is connected to, or as in the presently illustrated embodiment integral with spindle portion 48 for joint actuation and release of both the ball detents 18 associated with the rotational locking mechanism and the ball detents 76 associated with the pin locking mechanism. For this purpose and as illustrated, spindle portion 78 axially joins and is here integral with spindle portion 48 and is axially movable therewith in response to displacement of manually engageable release collar 17.

Furthermore, the pin locking means including pin 72 and ball detents 76 is provided with a retractable ball detent captivating sleeve means cooperating therewith to provide for automatic insertion and locking of the pin locking means in receptacle 73.

More particularly and with reference to FIG. 5, the sleeve means is provided by a hollow cylindrical sleeve member 86 coaxially, slidably mounted about the exterior circumference of pin 72. When pin 72 is removed from receptacle 73, the sleeve 86 is forced axially forward to an extended position as shown in FIG. 5 under the influence of a spring bias means. In this instance the spring bias is provided by a coiled compression spring 87.

In the forward or extended position of sleeve 86, ball detents 76 are captivated in their radially inward retracted condition. This is best illustrated in FIGS. 4 and 5. It is also observed that in this condition, spindle portion 78 is forced to an axial position in which the reduced diameter section 88 is in a position in registration with openings 81 to permit the retraction of the ball detents 76 as illustrated in FIG. 5. The exterior of pin 72 and sleeve 86 appear as shown in FIG. 4 with the ball detents 76 hidden from view.

To lock pin 72 and ball detents 76 in place, a nose or forward end portion 89 of pin 72 is inserted into receptacle 73 and pressed forwardly to cause the axial end 91 of the sleeve to abut against the front perimeter 92 of receptacle 93 and force the retractable sleeve rearwardly relative to pin 72 against the spring bias provided by spring 87. This not only allows pin 72 to be inserted fully into receptacle 73 but also releases ball detents 76 to be cammed to their radially outward protruding condition by a tapered camming section 93 provided on spindle portion 78 axially adjacent the reduced diameter section 88.

Thus during insertion of pin 72 the ball detents 76 are first released by the retracting sleeve 86 to be initially captivated by the inner circumferential wall of receptacle 73 and subsequently released to the protruding, locking position as shown in FIGS. 2 and 3 upon full insertion of the pin.

In this manner the ball detent pin locking means provided at end 71 of strut member 12 is automatically locked in place by merely pressing pin 72 into place within receptacle 73. It is unnecessary to release the ball detents 76 to their retracted position because of the automatic, captivating effect of retractable sleeve 86. To release pin 72 from receptacle 73 it is merely necessary to manually actuate release collar 17 to cause spindle portion 78 to be moved to a position in which ball detents 76 may retract radially inwardly thus allowing pin 72 to be removed from the receptacle.

Collar 17 thus not only releases the locking mechanism associated with ball detents 18 and support 13, but also releases the pin locking means mounted at the opposite end 71 of strut member 12.

During withdrawal of pin 72 from receptacle 73, sleeve 86 automatically returns to its extended position as shown in FIG. 5 under the bias of compression spring 87. In fact, the spring bias associated with retractable sleeve member 86 tends to assist in the removal of pin 72 by applying a slight axial withdrawal force as the sleeve 86 returns to its extended position. The ball detents 76 are maintained in their captivated, retracted condition at all times during withdrawal of pin 72 from the receptacle such that sleeve member 86 merely slides over and captivates the detents in their already retracted condition.

In the presently illustrated embodiment, pin 72 is mounted in axial alignment with and interiorly of hollow tubular part 27 of member 12 by means of an enlarged cylindrical base portion 94 fixedly secured to the interior cylindrical wall of part 27. Base portion 94 is recessed inwardly of the axial end 96 of part 27 as illustrated to accommodate the retraction of sleeve member 86 and the mounting of biasing spring 87. An annular shoulder 97 is created at the junction of base portion 94 of the pin and the relatively smaller diameter portion of pin 72 itself to provide an abutment for one end of spring 87. The other end of spring 87 abuts against an annular shoulder 98 provided by an external annular flange 99 on the rearward end of sleeve member 86 as shown. Flange 99 also serves as a stop or limit for engaging a rearwardly facing annular shoulder 101 defined by an annular retaining insert 102. Insert 102 may be fixed in place by a press fit with the interior circumferential wall of part 27 or by other suitable means. Similarly, base portion 94 of pin 72 is secured by a press fit or other suitable means at its recessed location inside tubular part 27.

Referring to FIG. 6, an alternative embodiment of the rotatable, lockable strut mechanism is illustrated in which an assembly 111 including elongate rotatable strut member 112, similar to strut member 12 in FIGS. 1 through 6, is pivotally connected to a support member 113 which is similar to the above-described support member 13. In this instance, however, support member 113 is in turn secured to one end of a second elongate strut member 115 such that members 113 and 115 together form an elongate strut support means. One end of strut member 115 is adapted to be fastened to a relatively stationary anchor point 120 by a suitable means, such as the here illustrated eye bolt assembly 125. If desired, eye bolt assembly 125 may be pivotally mounted to a supporting anchor pin 130 to permit rotational movement of strut member 115 in a desired rotational plane.

In this manner, support member 113 provides a relatively movable support for the pivotally mounted rotatable, lockable strut member 112 about the pivotal axis provided by support member pin 123 corresponding to pin 23 in the above-described embodiment.

Thus, strut members 112 and 115 are relatively rotatable in scissor-like fashion. Moreover, these members may be releasably locked at a desired angular relationship by appropriate positioning of the indent locking means on support member 113. For example in the illustration of FIG. 6, indentations 135, only one of which can be seen in the figure, are provided for cooperating with the movable ball detent means carried by strut member 112 to lock the members 112 and 115 at an angular relationship of 180°. Such an angular relationship may correspond to a desired load bearing position in which a load is supported between anchor pin 130 cooperating with eye bolt assembly 125 of member 115 and another pin (not shown) cooperating with an eye bolt assembly 140 mounted to strut member 112. Assemblies 125 and 140 are shown for illustration only, and any suitable fasteners, brackets, or other mounting means may be provided on the remote ends of members 112 and 115.

To release members 112 and 115 for relative rotation, a manually engageable release collar 117 corresponding to collar 17 of the previous embodiment may be actuated to release the ball detents locked in indentations 135. This frees strut member 112 for rotation whereupon it may be rotated to a stowed out-of-the-way position shown by the dotted line position of FIG. 6. Although not provided here, an additional locking indent means may be provided on support member 113 for locking strut member 112 in the stowed out-of-the-way position.

Like support member 13 of FIGS. 1 through 3, support member 113 may be provided by a pair of spaced parallel, semicircular walls one of which is shown in FIG. 6 as wall 137 corresponding to wall 37 of support member 13. Similarly, if desired a base portion 166 may be provided corresponding to base portion 66 of support member 13 for joining the pair of semicircular walls of member 113. Support member 113 may be secured to strut member 115 by any suitable means. In this instance an extension 145 is provided integral with the pair of spaced parallel walls (wall 137) and base portion 166 and having an interior cylindrical wall 150 fixedly receiving an exterior cylindrical wall 155 of strut member 115.

Although the spaced parallel walls 36 and 37 of support member 13 and the corresponding walls, one of which is shown as wall 137, of support member 113 are here of semicircular configuration, other partial circular configurations may be provided depending upon the application. For example, in either of the two embodiments shown in FIGS. 1 through 6, it may be desirable to provide more or less than 180° of relative rotation between the rotatable strut member and the associated support member. In such case, the spaced parallel walls of the support members may generate any desired partial circle, from for example a 45° partial circle segment to a full 360° circle segment, to accommodate the necessary or desired angular rotation between the members. Thus, any partial circular configuration in which the spaced parallel walls, such as walls 36 and 37 of support member 13 or corresponding walls of member 113 are coextensive with the desired angular rotation between the strut and support members is comtemplated.

With reference now to FIGS. 7 through 12, the rotatable, releasable ball detent locking mechanism of the present invention is provided in combination with a retractable hand-held carrier bar assembly 181 for a rack mounted chassis 182. Chassis 182 may be an instrumentation chassis or the like adapted to be removably mounted in a rack frame 196. Assembly 181 in this instance includes a pair of brackets 183 and 184 adapted to be firmly fastened to a front panel 186 of chassis 182, wherein brackets 183 and 184 here serve as the support members to which a pair of rotatable arm members 187 and 188 are pivotally mounted. Arms 187 and 188 in turn serve to support a hand-held carrier bar 189 mounted between and generally at right angles to arms 187 and 188 adjacent ends 191 and 192 thereof remote from the pivotally mounted arm ends 193 and 194.

Carrier bar 189 together with arms 187 and 188 is rotatable between an outwardly extended manually accessible position as shown in FIG. 7, and a retracted out-of-the-way position shown by the solid line position in FIG. 9. In the extended position as shown in FIG. 7, bar 189 may be manually grasped and the chassis 182 pulled outwardly from its rack location for transporting to another location. When the chassis is in place in the rack, bar 189 and its associated arms 187 and 188 may be rotated to the retracted position for unincumbered vision of the panel 186 and easy access to any manual controls provided thereon.

In accordance with the present invention, arms 187 and 188 and brackets 183 and 184 are provided with a ball detent locking mechanism and cooperating locking detent means to provide for releasably securing bar 189 in either its extended outward position or retracted position. In this manner brackets 183 and 184 serve a similar function to the support means provided by supports 13 and 113 in the embodiments of FIGS. 1 through 6, while arms 187 and 188 are analogous to the rotatable strut members 12 and 112 in these former embodiments.

Additionally, chassis locking means are provided in combination with brackets 183 and 184 and arms 187 and 188 for locking chassis 182 to rack 196. In this instance, the chassis locking means are provided by linkage assemblies 197 and 198 for selectively rotating hook catch members 201 and 202 between locked and released positions relative to cooperating keepers or anchor brackets 203 and 204 firmly secured to rack 196 as shown in FIG. 7. The cooperation between hook catch member 201 and anchor bracket 203 is best illustrated in FIG. 9 with the solid lines showing the locked or latched position of member 201 and the broken lines illustrating its release position.

The chassis locking means provided by the above-described members is advantageously combined with the rotatable movement of arms 187 and 188 with respect to brackets 183 and 184 so as to dispose members 201 and 202 in their released position when arms 187 and 188 and carrier bar 189 are rotated to the outwardly extended position as shown in FIG. 7. This cooperation disposes carrier bar 189 for manual grasping and simultaneously releases the chassis 182 from its latched engagement with respect to the rack anchor brackets 203 and 204.

Conversely, when carrier bar 189 is rotated to its retracted position by the rotation of arms 186 and 187 to the solid line position shown in FIG. 9, members 201 and 202 are rotatively displaced by linkages 197 and 198 to the latched or locked position in which the chassis is positively secured in place. Thus anytime bar 189 is released and rotated to the outwardly extending position, the chassis is automatically released to permit removal from the rack for handcarried transportation to another location.

More particularly with respect to the ball detent locking assembly, both bar supporting arms 187 and 188 or as in this case one of arms 187 and 188 is provided with a spindle receiving bore means here in the form of a longitudinally extending bore 206 and transverse detent receiving opening means in the form of a pair of diametrically opposed openings 207 provided in arm member 187 as best shown in FIGS. 10 and 11. As in the case of the above-described embodiments of the invention, bore 206 is adapted to receive a spindle release means in the form of an elongate spindle 208 adapted for axial reciprocation within bore 206, and openings 207 are adapted to receive ball detent means in the form of ball detents 209, whereafter openings 207 may be staked at the outermost perimeters thereof to prevent the escapement of the ball detents therefrom.

Openings 207 and the ball detents 209 mounted therein are disposed at an offset distance from the pivotal axis of arm 187 defined by pivot pin 211 carried by support member bracket 183.

Bracket 183 is similar to the above-described support members 13 and 113 in that it is formed with a pair of spaced parallel walls 212 and 213 which define inwardly facing wall portions 216 and 217 which are in closely confronting relationship with the outwardly facing exterior parallel walls 218 and 219 of arm member 187 adjacent openings 207 and ball detents 209 as best shown in FIGS. 8 and 10. Additionally, the spaced parallel walls 212 and 213 of bracket 183 are formed together as a structural unit with a base portion 221 which may be provided with mounting holes 222 for attachment of the bracket to the front panel 186 of the chassis.

In this particular embodiment, walls 212 and 213 are extended in one direction to provide a channel recess for receiving and supporting linkage 197 of the chassis locking means, and in the opposite direction to provide a channel recess into which the greater portion of arm 187 may nest while in the retracted out-of-the-way position.

Similarly, bracket 184 is provided in this instance with extended parallel walls corresponding to walls 212 and 213, even though arm 188 in this instance is not provided with the ball detent locking assembly.

Locking detent means are formed in a support member bracket 183 for cooperating with ball detents 209 for locking the assembly in either the extended or retracted positions. In particular, angularly offset indentations 223 and 224 are provided on the inwardly facing wall portions 216 and 217 of walls 212 and 213. Indentations 223 serve to cooperate with ball detents 209 to lock arms 187 and 188 and bar 189 in the retracted position, while indentations 224 secure the arms and carrier bar in the outwardly extended position.

The spindle release means provided by spindle 208 may be associated with a manually engageable actuator release means for manually releasing the locking mechanism from either of the two locked positions. In this instance a manual or thumb release pushbutton member 226 is provided as an integral extension of spindle 208 so as to protrude outwardly from end 191 of member 187 through a counterbore 227. A biasing means in the form of a spring 228 may be mounted in counterbore 227 under compression between an annular shoulder 229 and an external radial flange 231 on spindle 208 for continuously urging spindle 208 and push-button member 226 toward end 191 of arm member 187. A retainer insert 232 which may be suitably secured at the entrance of counterbore 227 serves as a limit to the movement of spindle 208 under the urging of spring 228.

From the position shown in FIGS. 9 and 10, pushbutton member 226 and spindle 208 may be displaced inwardly so as to move the reduced diameter section 233 of spindle 208 into registration with openings 207 and allow ball detents 209 to move inwardly to the retracted, released position. This latter position is illustrated in FIG. 11.

As in the case of the above-described embodiments, spindle 208 may be provided with a camming section 234 adjacent reduced diameter section 233 to provide a means for camming ball detents 209 outwardly to their protruding, locked position under the urging of biasing spring 228 acting on spindle 208. Again, it is observed that ball detents 209 can be displaced to their protruding, locked position only when arm 187 is rotated to one of the positions which cooperate with indentations 223 or 224. At any intermediate position of rotation such as illustrated by the dotted line intermediate position in FIG. 9 for arm 187, the ball detents 209 remain captivated in their retracted position by the abutment of the ball detents against the closely confronting inwardly facing wall portions 216 and 217 of bracket 183.

In this particular embodiment, the linkages 197 and 198 associated with the chassis locking means include elongate linking members 251 and 252, respectively, for forced rotation of catch members 201 and 202 in response to rotation of arms 187 and 188. Catch members 201 and 202 are rotatably mounted about pivot pins, such as pivot pin 253 best shown in FIGS. 7 and 9 for rotation of the respective hooked portions, such as portion 254 of member 201 into and out of hooked engagement with anchor pins of brackets 203 and 204, such as anchor pin 256 of assembly 203 as shown in FIG. 9.

FIG. 9 illustrates the position of anchor pin 256 both in the latched, dotted line position, and the released, solid line position. Furthermore, as members 201 and 202 are rotated out of the hooked, locked position, an abutment portion, such as portion 257 of member 201 is moved into engagement with pin 256 to force the entire chassis assembly outwardly with respect to rack 196.

Thus members 201 and 202 not only unhook themselves with respect to the anchor pins, such as pin 256, but also these members force the chassis ajar as arms 187 and 188 and bar 189 are drawn upwardly to the outwardly extended position as shown in FIG. 7.

Link members 251 and 252 are pivotally mounted at opposite ends thereof between the associated arm and catch member, such as illustrated by the pivotal connecting pins 261 and 262 in FIGS. 7, 8, 9 and 12. With reference to FIG. 9, it is observed that link members 251 serves to force member 201 at pivotal connection 261 upwardly when arm 187 is drawn upwardly to the outwardly extended position. This disposes the hooked portion 254 of catch member 201 in the dotted line release position.

Similarly, the downward movement of arm 187 to the retracted position, draws link member 251 downwardly at pivotal connection 262, thus forcefully rotating member 201 via pivotal connection 261 to a position with catch portion 254 hooked relative to anchor pin 256. The same construction and operation applies to catch member 202 and link member 252 cooperating with anchor bracket 204.

A spring bias means in the form of spring 266 may be provided as best shown in FIG. 9 for biasing arms 187 and 188 toward their outward extended positions. Here spring 266 is disposed on a stud 267 provided on bracket 183 between walls 212 and 213.

With reference to FIGS. 13 through 17, the releasable ball detent locking mechanism of the present invention is provided in combination with a collapsible crank handle assembly 271. In this assembly, a manually engageable handle 272 may be released from a locked, retracted position as shown in FIG. 15 and rotated to an outwardly extended position as shown in FIGS. 13 and 14 for forced, manual rotation of crank shaft 273.

More particularly, assembly 271 includes an arm 274 transversely connected to shaft 273 at connector 276.

Transverse arm 274 provides the support member corresponding to support members 13, 113 and support brackets 183 and 184 of the previous embodiments, and as such includes a pair of spaced parallel walls 277 and 278. Walls 277 and 278 are joined at one end to connector 276 and joined at their opposite end by an integral connection portion 279.

Handle 272 serves in this instance as the rotatable member similar to rotatably strut members 12 and 112 and for this purpose is generally elongate and has one end pivotally mounted to arm 274 by pivot pin 281 carried by arm 274 at a position remote from the rotational axis of shaft 273 as illustrated.

In particular, pin 281 is carried between walls 277 and 278, with handle 272 pivotally mounted therebetween for rotation between the aforementioned retracted and extended positions. In the retracted position, handle 272 is disposed in substantial juxtaposition with arm 274 recessed between spaced parallel walls 277 and 278. In the outwardly extended position, the rotatable member providing handle 272 extends substantially at a right angle to arm 274.

Handle 272 is formed with a spindle receiving bore means, in the form a bore 282 and with transverse ball detent receiving opening means in the form of openings 283 disposed adjacent the pivot pin 281. Bore 282 and transverse openings 283 are adapted to receive a spindle release means in the form of spindle 284 and movable ball detent means in the form of ball detents 286. Ball detents 286 cooperate with locking indent means provided on arm 274 at the inwardly facing wall portions 287 and 288 of spaced parallel walls 277 and 278. In this instance, the locking indent means take the form of indentations 301 and 302 for locking handle 272 in the outwardly extended operative position or retracted out-of-the-way position.

A manually engageable actuator means may be provided similar to the actuator means provided in the retractable chassis carrier bar assembly 181 of FIGS. 7 through 12. Thus, a manual or thumb engageable pushbutton release member 303 is provided as an axial integral extension of spindle 284 for operating ball detents 286 between their protracted, locked position and their retracted, release position. Furthermore, handle 272 may be provided with a construction similar to arm 187 of FIGS. 7 through 12 for receiving a biasing spring 304 to provide for biasing spindle 284 to an axial position away from the pivotally connected end of the handle. As illustrated in FIG. 16, this position forces ball detents 286 to their protruding, locked disposition, while inward depression of member 303 as shown in FIG. 17 releases ball detents 286 to their retracted, released position by reason of the axial displacement of the reduced diameter section 306 of spindle 284.

A freely rotating handle sleeve 307 may be coaxially slipped over a cylindrical body 308 of handle 272 to permit relative rotation between the operator's hand and body 308 during operation of the crank.

An annular retaining cap 309 suitably secured to the end of handle 272 retains sleeve 307 in place and limits the outward axial displacement of spindle 284 under the bias of spring 304 by reason of external flange 311.

With reference to FIGS. 18 through 23, a still further embodiment of the releasable ball detent locking mechanism of the invention is provided in the form of an overcenter latch assembly 315. Although the latch may be adapted for use in a variety of applications, assembly 315 is here shown to provide a releasable latch for securing a pivotally mounted door or hatch 316 to a perimeter wall 317 defining the hatch opening 318. As one example, opening 318 may be associated with an aircraft hatch opening in which hatch 316 provides the closure therefore.

Assembly 315 may be secured to hatch 316 by suitable fastening means, such fasteners 319 which pass through portions of a flange 321 of the assembly support 322.

To provide the latching and unlatching of hatch 316 relative to perimeter wall 317, a catch member 323 is rotatably mounted to assembly support 322 by a pivot pin 324. This permits member 323 to rotate between a latched, locked position shown in FIG. 19 and an unlatched, unlocked position as shown in FIG. 23. In particular, a catch portion 326 of member 323 engages a rearwardly facing shoulder portion 327 of wall 317 in the latched position condition of member 323 illustrated by FIG. 19.

To rotate catch member 323 between the latched and unlatched positions, an exposed, manually displaceable panel 328 lying generally flush with the exterior surfaces of hatch 316 and wall 317 forms an actuator portion of a rotatable member 329 rotatably carried with respect to support 322 by means of a pivot pin 331. The pivotal mounting of member 329 and its actuator panel 328 form in essence an overcenter latch mechanism in that a rear area 332 of panel 328 is pressed to cause member 329 to rotate and open the latch, whereas a forward area 333 of panel 328 is pressed to force the assembly to the latched position.

Linkage means is provided for forcing the rotation of catch member 323 in response to pivotal displacement of member 329. In particular, this linkage means is provided by a link member 334 pivotally connected at one of its ends to member 329 by a pivot pin 336 and connected at the opposite end to member 323 by a pivot pin 337.

Accordingly, members 329 and 322 form the rotatable member and support member, respectively, similar to the abovedescribed embodiments of the invention in FIGS. 1 through 17. To provide for locking latch assembly 315 in its latched condition, that is the position shown in FIG. 19, a ball detent latching assembly is mounted within member 329 for cooperating with locking indent means provided on support 322.

In particular, rotatable member 329 is provided with a spindle receiving bore means in the form of a bore 341 extending in this instance generally normal to panel 328 and slightly rearwardly of pivot pin 331. Additionally, transverse ball detent receiving opening means are provided in member 329 in the form of laterally opposed, transverse openings 342 which communicate with bore 341.

In this instance, bore 341 further includes a hollow cylindrical bushing 343 fixedly mounted within bore 341 following the installation of the spindle release means in the form of spindle 344 and biasing spring 346. Transverse openings 342 extend through bushing 343 as illustrated such that the ball detent means mounted within openings 342 will engage and be operated by spindle 344.

In this instance, the movable ball detent means are provided by a pair of ball detents 347 mounted within each of the laterally opposed openings 342 provided on both sides of spindle 344. The tandem mounting of the dual pairs of ball detents 347 serves to provide a locking action at a greater distance from the centrally located spindle 344 such that the relatively greater width of rotatable member 329 may be accommodated. As in the case of previous embodiments, the exterior perimeters of openings 342 may be staked to limit the laterally outward displacement of bail detents 347.

Support 322 as in the case of the support members of the previously described embodiments, serves as the framework for locating the locking indent means which cooperate with the bail detents 347. In particular and in this instance only one locking position is provided for the rotatable movement of member 329 and that position is defined by the placement of indentations 351 formed in the inwardly facing wall portions 352 and 353 of spaced apart parallel walls 356 and 357 of support 322. Indentations 351 are placed in this instance to cause member 329 to be locked by the ball detents 347 when the assembly is in the latched position with catch members 323 engaging shoulder 327 of perimeter wall 317.

In effect, the ball detent locking means serves as a double or redundant lock to provide a measure of safety, insuring that the assembly is maintained in the latched condition.

Release means are provided for axially displacing spindle 344 to cause the ball detents 347 to be released from their locked, protruding condition as shown in FIG. 21 and to allow repositioning thereof to their inwardly displaced, retracted condition as shown in FIG. 22.

For this purpose various types of release mechanisms or actuators may be provided for axially displacing spindle 344. In the present embodiment, a safety type release is provided in which a tool 356, which may be as simple as a screwdriver blade or similar structure, is inserted into an angulated recess 357 formed in panel 328 of member 329 and into which an upper stem portion 358 of spindle 344 protrudes.

Insertion of tool 356 in this manner engages stem portion 358 of spindle 344 and forces it downwardly as illustrated in FIG. 22 against the spring bias exerted by compression spring 346. This axial displacement serves to reposition the reduced diameter section 359 of spindle 344 to register with openings 342 and allow the ball detents to retract inwardly. Similarly to the previous embodiments, a camming section 361 may be provided on spindle 344 adjacent section 359 for outward camming of ball detents 347 to their locked, protruding position under the influence of biasing spring 346.

After actuating spindle 344 to retract ball detents 347 and permit rotation of member 329 out of its locked, latched position and toward the open position, the ball detents remain captivated in the retracted position by engagement thereof with wall portions 352 and 353 of support 322. Accordingly, spindle 344 and stem 358 remain in the depressed condition as shown in FIG. 22 so long as member 329 remains in the open position of FIG. 23. By manually engaging the area 333 of latch panel 328, member 329 may be manually urged from the open position shown in FIG. 23 to the closed, latched position whereupon ball detents 347 will snap outwardly to the protruding, locked engagement within support member indentations 351.

Without employing tool 356 or a similar object for operating stem 358 of spindle 344, any attempted manual forcing of panel 328 of member 329 will not cause opening of the latch. Also it is noted that by proper manipulation of tool 356, both spindle 358 may be depressed to unlock the ball detents and an appropriately placed force may be applied to panel 328 in area 323 to cause the overcenter latch member 329 to rotate to the open, unlatched position.

While only a limited number of embodiments of the present have been disclosed herein, it will be readily apparent to persons skilled in the art that numerous changes and modifications may be made thereto without departing from the spirit of the invention.

Accordingly, the foregoing disclosure and description thereof are for illustrative purposes only and do not in any way limit the invention which is defined only by the following claims.

I claim:

1. A releasable detent locking mechanism with rotatable movement, comprising:
   first and second pivotally connected members having closely confronting wall portions which undergo relative rotational movement while maintaining substantially constant clearance therebetween;
   an elongate spindle receiving bore means provided in said first member and extending adjacent to and inwardly of the associated wall portion;
   at least one transverse detent receiving opening means extending in said first member between said associated wall portion and said bore;
   spindle release means mounted for axial movement in said bore means;
   movable detent means disposed in said detent receiving opening means for cooperative movement of said detent means by said spindle release means between protruding and retracted positions relative to said first member wall portion; and
   locking indent means provided in said second member wall portion confronting said first member wall portion and being positioned in the rotational path of said detent means for cooperating with said detent means in its protruding position to lock said members against the otherwise relative rotatability therebetween, whereby said detent means may be displaced between its protruding and retracted positions by said spindle means to lock or release the relative rotatability of said members respectively.

2. The releasable detent locking mechanism of claim 1, wherein said locking indent means comprises at least first and second angularly offset indentations in said second member wall for selectively locking said members against relative rotation at two different relative angular orientations.

3. The releasable detent locking mechanism of claim 1, wherein said detent means comprise ball detents, said second member being a support for pivotally supporting said first member, and said first member being provided with manually engageable actuator means for selective manual operation of said spindle release means, whereby said first member may be selectively manually released or locked for rotation relative to said second member and locked in place by said indent means.

4. The releasable detent locking mechanism of claim 1, further comprising:
   a manually engageable actuator means mounted on said first member and being connected to said spindle release means for manual actuation thereof to cause movement of said detent means between its protruding and retracted positions, whereby said manually engageable actuator may be manipulated to release said members from their locked condition and thus permit relative rotation therebetween.

5. The releasable detent locking mechanism of claim 1, wherein said spindle release means includes spring means continuously urging said spring release means to move said detent means to said protruding position relative to said associated wall portion of said first member, and said opposing wall portion of said second member engaging said detent means and maintaining said detent means substantially in said retracted position when said members are in an angular orientation other than in which said detent means are locked in said indent means, whereby said closely confronting wall portions of said members maintain said detent means captivated substantially in said retracted position until said members are rotated to a position in which said indent means allows said detent means to be forced outwardly to its protruding position by said spindle release means under the influence of said spring means.

6. The releasable detent locking mechanism of claim 5, wherein said spindle release means includes an elongate spindle disposed for axial movement in said bore means, and said spindle having camming means adjacent said detent receiving opening means for moving said detent means between said retracted and protruding positions in response to axial movement of said spindle.

7. The releasable detent locking mechanism of claim 1, wherein said first member comprises an elongate strut member having one end pivotally mounted to said second member which provides a support member for said pivotal struct member, a second end of said strut member being rotatable to and from a load bearing position; said spindle receiving bore means and said spindle release means being disposed coaxially within said strut member; and said locking indent means being provided on said support member for releasably locking said strut member at desired angular orientation relative to said load bearing position, whereby said strut member may be rotated between one angular position in which for example the strut member is disposed in an out-of-the-way stowed position and another angular position corresponding to the aforesaid load bearing position and said indent means may be located on said support member to releasably lock said strut member in either or both of said angular positions.

8. The releasable detent locking mechanism of claim 7, further comprising:
manually engageable release actuator means carried by said strut member and connected to said spindle release means for releasing said detent means from the locked protruding position to said recessed position to permit rotation of said strut relative to said support member.

9. The releasable detent locking mechanism of claim 8, said manual release actuator means comprising an axially movable collar member mounted coaxially about said strut member at an intermediate longitudinal position thereon and being connected to said spindle release means, whereby said collar member may be manually grasped and axially displaced to release said strut from its locked condition relative to said support member.

10. The releasable detent locking mechanism of claim 7, said detent means comprising at least one ball detent, said support member comprising a base portion and a pair of spaced apart substantially parallel walls, said first end of said strut member being pivotally mounted for rotation between said walls and in a plane parallel thereto about an axis extending transversely of and between said walls, said closely confronting wall portions of said strut and support members being defined by the inwardly directed faces of said walls of said support member and the laterally opposed surfaces of said strut member adjacent said pivotal axis, said locking indent means being provided on said inwardly directed faces of said walls of said support member.

11. The releasable detent locking mechanism of claim 10, said support member being further defined by said walls having a partial circular configuration with a radius center point generally coincident with said pivotal axis to provide said wall portions for said support member which are at least coextensive with the rotational path of said detent means carried by said strut member whereby said locking indent means may be provided at any desired angular location on said support member wall portions.

12. The releasable detent locking mechanism of claim 7, further comprising: an automatically lockable and manually releasable detent pin locking means mounted on the second end of said strut member for releasable locking engagement with a pin receiving receptacle means provided in association with said load, said detent pin locking means including a spindle release means, and manually engageable actuator means carried by said strut member and being connected to both said first named spindle release means and said spindle release means associated with said pin locking means, whereby said actuator means may be actuated to release said strut member from its locked angular orientation relative to said support member to allow rotation relative thereto and to release said pin locking means from locked engagement with said receptacle means associated with said load.

13. The releasable detent locking mechanism of claim 12, wherein said detent pin locking means comprises:
a cylindrical pin member coaxially mounted to said second end of said strut member and having an axial end portion protruding axially outwardly therefrom, said cylindrical pin member having an axial bore;
at least one transverse detent receiving opening means provided in said cylindrical pin member and communicating between an exterior cylindrical surface thereof and said axial bore;
an elongate release spindle means mounted for axial movement in said bore and having camming means disposed thereon for selectively positioning said detent between recessed and protruding positions relative to said exterior surface of said pin member; and
retractable detent captivating sleeve means coaxially cooperating with said pin member and said detent to assume a captivating protracted condition when said pin member is removed from said receptacle means and to assume a retracted detent release condition upon inserting the axially protruding end portion of said pin member into said receptacle means such that said protracted condition of said retractable sleeve means serves to force said detent into said retracted position and to allow the pin locking means to be automatically inserted into a receptacle means without operating said release spindle means whereupon said retractable sleeve means is automatically forcefully retracted by such insertion to permit said detents to be forced outwardly by said release spindle means to assume said protruding position for locked engagement within said receptacle means.

14. A releasable locking mechanism comprising:

a support member;

an elongate strut member having one end pivotally mounted to said support member, a second end of said strut member being rotatable to and from a load bearing position;

an automatically lockable and manually releasable pin locking means including movable detents, said locking means being mounted on the second end of said strut member releasably engaging a pin-receiving receptacle means provided in said load, in locking engagement therewith; and said pin locking means including spindle release means for operating said movable detents and further including manually engageable actuator means carried by said strut member and being connected to said spindle release means, whereby said actuator means may be actuated to release the second end of said strut member from its locked engagement with said pin receiving receptacle.

15. The locking mechanism of claim 14, wherein said pin locking means comprises:

a cylindrical pin member coaxially mounted to said second end of said strut member and having an axial end portion protruding axially outwardly therefrom, said cylindrical pin member having an axial bore;

at least one transverse detent receiving opening means provided in said cylindrical pin member and communicating between an exterior cylindrical surface thereof and said axial bore, said movable detents being disposed in said detent receiving opening means;

an elongate release spindle means mounted for axial movement in said pin member bore and having camming means disposed thereon for selectively positioning said movable detents between recessed and protruding positions relative to said exterior surface of said pin member; and retractable detent captivating sleeve means coaxially cooperating with said pin member and said detents to assume a detent captivating protracted condition when said pin member is removed from said receptacle means and to assume a retracted detent release condition upon inserting the axially protruding end portion of said pin member into said receptacle means that said protracted condition of said retractable sleeve means serves to force said detents into said retracted position and to allow said pin locking means to be automatically inserted into said receptacle means and locked therein without operating said release spindle means whereupon said retractable sleeve means is automatically forcefully retracted by such insertion to permit said detents to be forced outwardly by said release spindle means to assume said protruding position for locked engagement within said receptacle means.

* * * * *